(12) United States Patent
Barak et al.

(10) Patent No.: US 10,528,591 B2
(45) Date of Patent: *Jan. 7, 2020

(54) METHODS AND SYSTEMS FOR USING HINTS IN MEDIA CONTENT TAGGING

(71) Applicant: Facebook, Inc., Menlo Park, CA (US)

(72) Inventors: Dan Barak, Redwood City, CA (US); Gil Hirsch, Palo Alto, CA (US); Yaniv Taigman, Los Altos, CA (US); Cory West, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/835,068

(22) Filed: Dec. 7, 2017

(65) Prior Publication Data
US 2018/0095998 A1 Apr. 5, 2018

Related U.S. Application Data

(63) Continuation of application No. 13/940,146, filed on Jul. 11, 2013, now Pat. No. 9,858,298.

(51) Int. Cl.
  *G06F 17/30* (2006.01)
  *G06F 16/27* (2019.01)
  *G06F 16/58* (2019.01)

(52) U.S. Cl.
  CPC .......... *G06F 16/27* (2019.01); *G06F 16/5866* (2019.01)

(58) Field of Classification Search
  CPC ................................................ G06F 17/30268
  See application file for complete search history.

(56) References Cited

U.S. PATENT DOCUMENTS

| 2008/0091723 | A1 | 4/2008 | Zuckerberg |
| 2010/0318510 | A1 | 12/2010 | Ryu |
| 2012/0331064 | A1 | 12/2012 | Deeter |

*Primary Examiner* — Hung Q Pham
(74) *Attorney, Agent, or Firm* — Sheppard Mullin Richter & Hampton LLP

(57) ABSTRACT

Techniques to allow a social networking system to provide hints when a user tags an image. In one embodiment, a comment associated with an image to be tagged by a user of a social networking system is received. A hint based on the comment that is suggestive of at least one aspect relating to the image is identified. A set of candidate tags associated with the user is determined. At least one suggested tag from the set of candidate tags is selected based on the hint. The at least one suggested tag is provided for the user to potentially tag the image.

20 Claims, 7 Drawing Sheets

METHODS AND SYSTEMS FOR USING HINTS IN MEDIA CONTENT TAGGING

CROSS-REFERENCE TO RELATED APPLICATIONS

This application is a continuation of U.S. patent application Ser. No. 13/940,146, filed on Jul. 11, 2013 and entitled "METHODS AND SYSTEMS FOR USING HINTS IN MEDIA CONTENT TAGGING", which is incorporated herein by reference in its entirety.

FIELD OF THE INVENTION

The present application relates to media content tagging and, in particular, media content tagging using hints provided by social networking data.

BACKGROUND

Social networks provide a dynamic environment in which members can connect to and communicate with other members. Information typically shared through the environment include text-based messages and various types of media content, including images (e.g., graphics and photographs), which are generally added, uploaded, sent, or posted to the social network from its various members. In connection with the images received by them, social networks are often capable of receiving member-provided information that is intended to be associated with the images, such as member commentary and information that identifies or otherwise relates to objects depicted in the image. For example, where a photograph is received by a social network, the social network may also receive information from one or more members that relates to the subject matter depicted in the photograph, such as keywords describing depicted individuals.

The act of using keywords to describe an image is often referred to as "tagging" or "tagging an image" (e.g., tagging individuals in a photograph). Traditionally, images posted on social networks have been manually tagged through tagging features provided by social networks and utilized by members. The experience of social network members may be enhanced by the presentation of images that convey the additional contextual information reflected in image tags.

SUMMARY

To allow a social networking system to provide hints when a user tags an image, embodiments of the invention include systems, methods, and computer readable media to receive a comment associated with an image to be tagged by a user of a social networking system. Based on the comment, a hint suggestive of at least one aspect relating to the image is identified. A set of candidate tags associated with the user is determined. At least one suggested tag from the set of candidate tags is selected based on the hint. The at least one suggested tag is provided for the user to potentially tag the image. It should be understood that in various embodiments, hints can be used to tag media content other than just images, including animations, video and audio.

In an embodiment, the aspect includes at least one of identity of an individual depicted in the image, identity of an object depicted in the image, location of the image, identity of a person who created the image, classification of the image, or contextual information about the image.

In an embodiment, the set of candidate tags is associated with a set of members in a social network of the user.

In an embodiment, the hint is a link associated with a member in a social network of the user. The link may be to a profile associated with the member. The link may be embedded in the comment.

In an embodiment, the hint is identified based at least in part on natural language processing. The hint may comprise a name of an entity detected by natural language processing.

In an embodiment, image recognition is performed on at least one object depicted in the image, wherein the selecting the at least one suggested tag is further based on results of the image recognition. The image recognition may be based on a social signal, and the image recognition may comprise facial recognition.

In an embodiment, the at least one suggested tag is provided for the user in a list from which the user can select when tagging the image. The list may be sorted according to relevancy of the at least one suggested tag.

In an embodiment, the comment is created by the user or a member of a social network of the user.

In an embodiment, an action by the user to tag the image is detected. The action may comprise selection by the user of at least one of a position or a region in the image. The position and the region may correspond to a face of an individual depicted in the image.

Many other features and embodiments of the invention will be apparent from the accompanying drawings and from the following detailed description.

Figure 1:
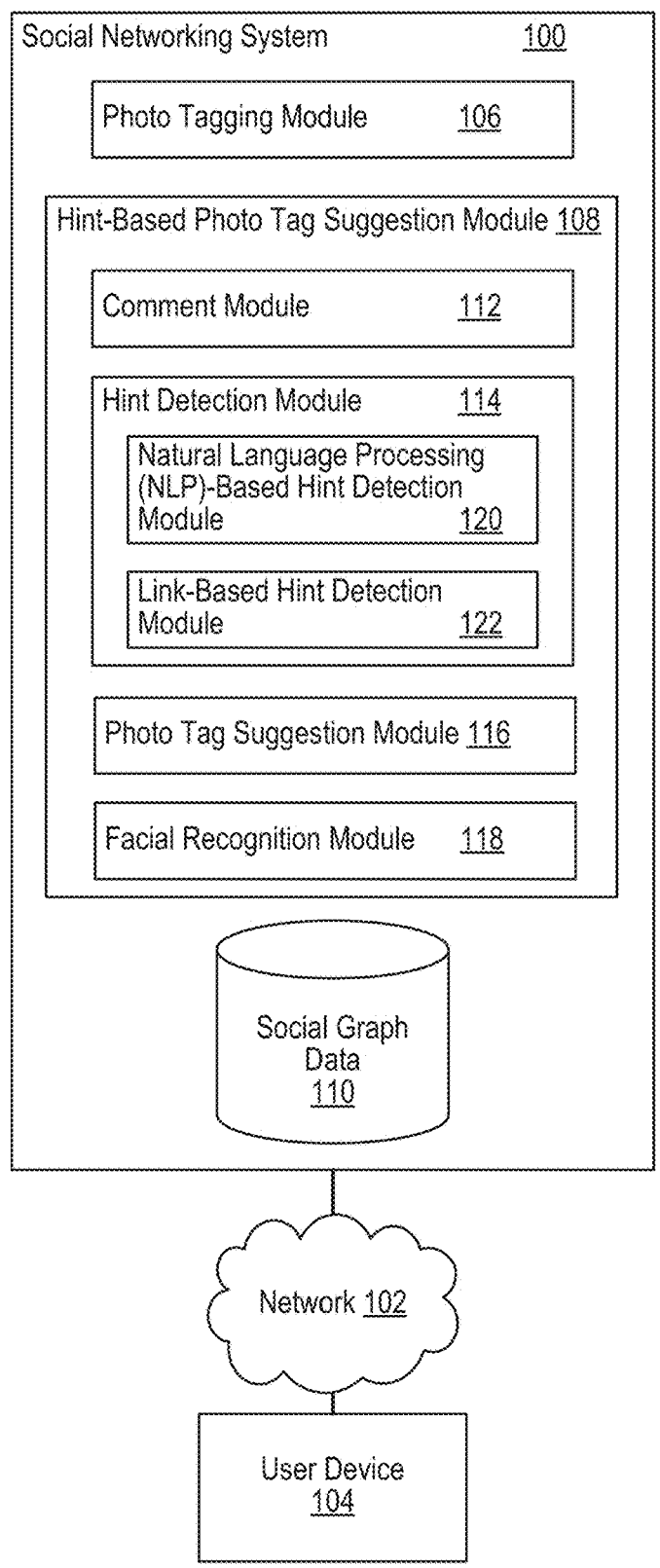
FIG. 1 illustrates an example system for using hints to tag images in a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

FIG. 1 illustrates an example system for using hints to tag images (e.g., photos) in a social networking system 100 in accordance with an embodiment of the invention. The social networking system 100 can be configured to communicate with one or more user devices and one or more external systems through one or more network connections. For illustrative purposes, FIG. 1 depicts the embodiment of the social networking system 100 communicatively coupled to a single user device 104 by way of a network 102, thereby permitting data communication between the social networking system 100 and the user device 104 over the network 102, as discussed in more detail below.

In FIG. 1, the social networking system 100 includes a photo tagging module 106, a hint-based photo tag suggestion module 108, and social graph data 110 stored on a computer-readable datastore. In an embodiment of the invention, the social networking system 100 may include additional, fewer, or different components for various applications. Some components are not shown so as to not obscure relevant details. In some embodiments, the photo tagging module 106, based on a hint, enables or otherwise assists a user of the social networking system 100 in associating one or more tags with one or more photos added, uploaded, sent, posted, or otherwise provided to the social networking system 100. As used herein, a "hint" can include any contextual information directly or indirectly associated with a photo that assists in identifying tags that can be suggested to a user as the user assigns or otherwise associates one or more tags to the photo.

As understood herein, a "tag" can comprise one or more terms or keywords that can be associated with any aspect relating to an item of media content, such as an image. As also understood herein, the act of "tagging" a media content item, such as an image, can comprise the act of associating one or more tags with that media content item. Once associated with a media content item, a tag can be used to describe the media content item and can further be used to organize, sort, and locate the media content item when the media content item is part of a larger collection of media content items. With respect to a photo, commonly used examples of tags can include, for example, names of individuals (e.g., those individuals depicted in the photo or present at the location of photo), subjects or topics relating to the subject matter depicted in the photo, the location of the photo, the time or date of the photo, classification or categorization of the photo, contextual information about the photo, or any other references related to any aspect of the photo. Accordingly, tagging a media content item can include tagging people, tagging places, mentioning people, and mentioning pages. In the context of social networks, tags may commonly include names of members of a social network, which may also include the name of the user performing the photo tagging action and connections of the user. It should be understood that in various embodiments, the tagging techniques described herein can be used to tag types of media content other than just images, including animation, video, and audio.

In some embodiments, a tag may be associated with a photo such that the association applies to the photo in general (e.g., applies to the photo as a whole) or to particular points or regions within the content presented by the photo. The latter of these tag types may be referred to as an "XY" tag, as the tag refers to one or more Cartesian coordinates in the content presented by the photo. Another example of a tag type includes a "mention" tag, which generally associates a photo with a social network member, regardless of whether the social network member is depicted in the content presented by the photo. Yet another example of a tag type includes a "with" tag, which identifies a social network member as being present at the time or location of the photo, regardless of whether the social network member is depicted in the content presented by the photo.

Associations formed between photos and tags can be maintained by the social networking system 100, for example, in the social graph data 110 supporting the social networking system 100. Associations may be maintained by the social networking system 100 such that a user can view, retrieve, or modify the associations, and can use the associations to locate or organize photos in the social networking system 100 based on tags. For some embodiments, tag associations can be included as part of the metadata of an image. Additionally, for some embodiments, a tag association can comprise an edge connection between an image and an object associated with the tag.

The photos to be tagged can include those posted to the social networking system 100, where the posted photo may be stored in the social networking system 100 or stored on an external system accessible by the social networking system 100. A tag, once associated with a photo, may be presented through the social networking system 100 as part of a description of the photo, such as a caption, commentary, or an overlay associated with the photo (e.g., mouse-over caption).

To enable a user to perform photo tagging actions, the photo tagging module 106 may provide a user interface that enables or otherwise assists the user in associating a photo with one or more tags. For instance, the photo tagging module 106 may provide a user with a graphical user interface (GUI) that permits the user to enter tags of the user's own choosing or to browse through and select from a list of pre-selected tags available for association with the photo. Through the GUI, a user may select a point or region within the content presented by a photo and then enter or select one or more tags that the user intends to associate with the selected point or region. After selection of the point or region, the photo tagging module 106 may prompt the user to enter a user-defined tag, to select one or more tags from the list of pre-selected tags, or some combination of both.

In some embodiments, where a user of the social networking system 100 intends to associate an individual depicted in a photo with a tag, the user may select a point or region in the photo intended to correspond with the individual (e.g., the individual's face or body) and, subsequently, enter a name for the individual or select one from a list of social network members. In certain embodiments, the list of social network members provided for user selection may comprise those members associated with the user on the social networking system 100 (e.g., user's friends in the social network) and/or social network members recognized in the photo by way of facial recognition technologies.

The hint-based photo tag suggestion module 108 may be configured to identify one or more hints in a comment associated with a photo and assist in providing one or more tag suggestions when a user is tagging the photo. In an embodiment, the photo for which the hint-based photo tag suggestion module 108 is providing tag suggestions may be the photo the user is currently attempting to tag. In this way, the hint-based photo tag suggestion module 108 may operate in real time or near real time. As shown in FIG. 1, the hint-based photo tag suggestion module 108 includes a comment module 112, a hint detection module 114, a photo tag suggestion module 116, and a facial recognition module 118.

For certain embodiments, the hint-based photo tag suggestion module 108 identifies hints and provides suggested tags by obtaining a comment associated with a photo the user intends to tag. The hint-based photo tag suggestion module 108 may identify a hint in or otherwise based on the comment that may be useful in suggesting at least one member of the social networking system 100 or other persons or objects. The hint-based photo tag suggestion module 108 may obtain a set of candidate members of the social networking system 100 that are associated with the user. The hint-based photo tag suggestion module 108 may generate a set of suggested members from the set of candidate members based on the hint. Tags associated with the set of suggested members may be provided to the user to assist the user in tagging the individual.

In an embodiment, tags associated with the set of candidate members also may be provided to the user. The tags associated with the set of suggested members may be prioritized in relation to the tags associated with the set of candidate members. For example, the tags associated with the set of suggested members may appear at the top of a larger listing of tags that is presented to the user.

In some embodiments, the hint-based photo tag suggestion module 108 performs some or all of the foregoing operations in response to the social networking system 100 detecting initiation of a photo tagging action by a user. For example, a photo tagging action may be detected when a user utilizes the photo tagging module 106 in an attempt to tag a photo in the social networking system 100. In some embodiments, the hint-based photo tag suggestion module 108 may commence its operations in response to a request by the photo tagging module 106 for suggested tags.

The comment module 112 can assist in obtaining one or more comments associated with the photo for which the hint-based photo tag suggestion module 108 is to provide one or more tag suggestions. Comments can include any remarks, captions, description, commentary, or any other information directly or indirectly related to a photo. The comments obtained can include those created in association with the photo or those associated with the photo after creation. Additionally, in the context of the social networking system 100, the comments obtained can include those comments created by social network members that post the photo to the social networking system 100 (e.g., comments created at the times of posting) and those created by other social network members (e.g., as part of a commentary or dialog associated with a posted photo). Further, comments can be provided by the users who are tagging the photo. For some embodiments, the comment module 112 may cause comments and information about their associations with images to be reflected in or maintained with the social graph data 110. The comments module 112 may retrieve comments and information about their associations with images from the social graph data 110.

While the comments obtained often contain text, comments also can comprise text or non-text objects, such as emoticons and the like. In some embodiments, a comment can also contain one or more links, each of which may constitute some or all of the content contained in the comment. Depending on the embodiment, the links may be associated with resources provided by the social networking system 100, such as a member profile, or associated with resources provided by systems external to the social networking system 100.

For example, as discussed herein, a link may lead a social network member to a profile page relating to a member or a group of members. Likewise, a link may lead to a web-based resource provided outside the social networking system 100, such as a third-party web site. For some embodiments, a link embedded in a comment is implemented as a hyperlink by the social networking system 100. The hyperlink is selectable by the social network members who can view the comment.

Different portions of a comment may provide hints to suggest tags. In an embodiment, the comment for which the hint-based photo tag suggestion module 108 may provide tag suggestions may contain no links. For example, the comment may be an entry provided by a social network member that contains only unlinked text. For some embodiments, portions of a comment that provide hints can include both text portions and non-text portions.

The hint detection module 114 may be configured to identify one or more hints from one or more comments associated with the photo for which the hint-based photo tag suggestion module 108 is to provide one or more tag suggestions. The hint detection module 114 of FIG. 1 includes a natural language processing (NLP)-based hint detection module 120 and a link-based hint detection module 122, each of which can assist in identifying hints in comments associated with the photo.

The NLP-based hint detection module 120 may be configured to identify, based at least in part on natural language processing, one or more tokens in a comment that may assist in determining tags that can be suggested to the user during a photo tagging action. In some embodiments, the NLP-based hint detection module 120 may identify a token in the comment based on the token's potential relevance to the contents presented by the photo being tagged or other contextual information about the photo that may be of interest to social network members who view the photo. In the context of a social network, potentially relevant tokens may include, for example, names of individuals, names of locations, names of events, time information, date information, names of objects, and the like. For some embodiments, the NLP-based hint detection module 120 may determine relevancy of tokens based on information provided by the social network, which may be found in the social graph data 110.

For example, consider where the NLP-based hint detection module 120 identifies names of individuals in a comment associated with the photo. The NLP-based hint detection module 120 may be configured to match or correlate the identified names to names of social network members having some type of connection or association with the user through a shared social network (e.g., members associated with the user as a friend, relative, or acquaintance). In an embodiment, the certain persons may be outside the social network of the user. The identified names function as hints for the purposes of determining suggested tags. Those identified names that match names of social network members may eventually be included in tags suggested by the hint-based photo tag suggestion module 108 during photo tagging operations. Other information relevant to tag suggestions, apart from names, may also be gleaned from a comment based on natural language processing.

The link-based hint detection module 122 may be configured to identify one or more links in a comment that may assist in determining tags that should be suggested to the user during a photo tagging action. As discussed herein, a comment can contain one or more links, where each link may be associated with a resource provided by the social networking system 100 or associated with a resource provided by a system external to the social networking system 100. For example, links to social network-based resources may include links to member profiles or links to group or network profiles (e.g., profile for a cohort of members).

A link to a social network-based resource (e.g., member profile or member information) can permit access to information provided by the social network-based resource. The accessed information can be used as one or more hints for suggesting tags during a photo tagging operation. For some embodiments, a social network member may create a link in a comment as the comment is being created or entered in connection with a photo. Further, some embodiments may automatically create a link in a comment, insert a link in the comment, or replace text in the comment with a link as the comment is being entered.

For example, as a comment is being entered (e.g., in connection with a photo), some embodiments may suggest a link for entry in the comment or auto-insert a link in the comment as text being entered for the comment is detected to be a potential link. In one example, the link-based hint detection module 122 may detect when a user is entering the names of one or more social network members (e.g., from the user's friend list) into a comment and suggest one or more of those names as a link for entry in the comment, or autocomplete one or more those names as a link in the comment. When a name of a social network member is entered or autocompleted as a link in this manner, the resulting link may be to a social network profile associated with the social network member. Similarly, the link-based hint detection module 122 may detect when a user is entering an Internet address to a web-resource in a comment (e.g., address to a third-party website) and suggest entry of a hyperlink, comprising the Internet address, in the comment. Information associated with a link in a comment may be used as hints to determine suggested tags.

In some embodiments, the hint detection module 114 may utilize one or both of NLP-based hint detection module 120 and link-based hint detection module 122 when attempting to identify hints in a comment. Where both the NLP-based hint detection module 120 and the link-based hint detection module 122 are utilized, various embodiments may utilize the NLP-based hint detection module 120 and the link-based hint detection module 122 in a particular sequence or, alternatively, utilize the NLP-based hint detection module 120 and the link-based hint detection module 122 substantially in parallel. For example, the hint detection module 114 may identify one or more hints first using the link-based hint detection module 122 and then identify one or more hints using the NLP-based hint detection module 120. Based on some embodiments, the NLP-based hint detection module 120 may be configured to ignore and/or convert any links or non-text content encountered in a comment during natural language processing.

For some embodiments, the hint detection module 114 may determine the identities of the social network members that post comments in connection with a photo. The hint detection module 114 may use those member identities as hints for tag suggestions. Based on the member identities, the hint detection module 114 also may obtain information regarding the identified members from the social networking system 100 as hints for tag suggestions.

The photo tag suggestion module 116 may receive one or more hints identified based on a comment associated with a photo and generate a set of one or more suggested tags based on the received hints. In some embodiments, the photo tag suggestion module 116 receives one or more hints identified based on the comment from the hint detection module 114.

For some embodiments, the set of suggested tags generated by the photo tag suggestion module 116 may be associated with a set of one or more suggested social network members associated with a user. The set of suggested social network members associated with a user may be obtained from the set of candidate social network members. The set of candidate social network members can include one or more social network members in general who have established a connection, relationship, or other association with the user. The kind of connection, relationship, or other association may be one involving a friendship, familial relationship, a business relationship, an acquaintance, or the like. Additionally, connections, relationships, or associations between users can be expressed in varying levels of degrees. For example, two users may have a first degree connection representing a direct connection (e.g., the two users are friends). As another example, two users may have a second degree connection representing a connection by way of common connection through a third user (e.g., friend of a friend). Any reference herein to a connection, relationship, or association should be understood to cover all varying levels of degrees, unless stated otherwise.

As described herein, such associations between social network members and a user may be maintained by the social graph data 110. In various embodiments, social network members generally associated with a user may be referred to as a "friend list."

The set of suggested social network members as well as the set of candidate social network members from which the set of suggested social network members is determined, and their associated tags, may be determined based at least in part on coefficients. In general, the social graph data 110 may include information about coefficients as measures of relatedness between nodes in the social graph of the social networking system 100. Coefficients may reflect weights for paths between nodes in the social graph. For example, coefficients may indicate that a user is closer to her best friend than to another person befriended by the user based on the respective weights of the paths that connect them.

Coefficients may be based on a variety of possible interactions between nodes, whether internal or external to the social networking system 100. Nodes may include users, people, pages, or any object in the social graph. The determination of coefficients may be directional, and depend on many factors, such as the relationship, interaction, or closeness between nodes in the social graph. As an example, the measure of relatedness of one user (e.g., User A) to another user (e.g., User B) may be based on various considerations including but not limited to whether: User A is friends with User B; User A commented on a photo of User B; User A liked content or a status update of User B; User A posted on the wall of User B; User A was on the same thread as User B; User A appears in the same photo as User B; a certain amount of time (e.g., days) transpires with (or without) User A engaging with User B or content of User B; User A linked to a comment of User B; User A shared content of User B with others; User A mentioned User B in a wall comment; User A viewed profile or other web page of User B; etc.

In the foregoing example concerning the determination of User A's coefficient for User B, many of the possible interactions informing the coefficient are based on actions of User A. However, other interactions involving actions of User B may also be considered in the determination of User A's coefficient for User B. Such interactions may include any variety of activities, such as whether: User B viewed a photo of User A; User B viewed an album of User A; a certain amount of time (e.g., days) transpires with (or without) User B engaging with User A or content of User A, etc. Further, the interactions that inform the determination of coefficients may be based on the time duration over which the interactions occurred (e.g., the last 30 days, 60 days, 90 days, or any other suitable time interval). Coefficients may also be based on a frequency of interaction within those historical time durations as well as other factors.

The photo tag suggestion module 116 may use coefficients to identify a set of candidate social network members from which the set of suggested social network members is determined. In an embodiment, the set of candidate members may represent a select group of only the "top friends" of the user as determined by coefficients. The set of candidate tags associated with the set of candidate members may be provided for the user to potentially tag a photo.

Likewise, the photo tag suggestion module 116 may use coefficients to determine the set of suggested social network members, which correspond to the set of suggested tags. If a hint results in the identification of many members from the set of candidate members as possible suggested members, coefficients may be used to prioritize the members or select from the members to arrive at the set of suggested members. In this way, coefficients may allow determination of suggested tags based on the importance of relationships between the user and other members in the social network. Suggested tags may be presented for the user to tag the photo.

The photo tag suggestion module 116 may ultimately provide the generated set of suggested tags for the user as the user is performing a photo tagging operation. In various embodiments, the set of suggested tags may be provided by way of the photo tagging module 106, which the user may utilize during photo tagging operations.

As described herein, the photo tagging module 106 may provide the set of suggested tags to the user as a list, from which the user can select one or more tags for association with a photo. The list of tags may be presented as a graphical overlay that appears over a photo as the user is associating one or more tags with the photo, for example, as an "XY tag," a "with" tag, or a "mention" tag. According to some embodiments, the suggested tags may be listed in an order that corresponds to the suggestion strength of each suggested tag. The suggestion strength of a suggested tag may be based on the relevancy of the suggested tag to the applicable hint.

In certain embodiments, the facial recognition module 118 can be configured to perform facial recognition on one or more faces of individuals depicted in a photo that a user is intending to tag, subject to privacy settings of the individuals. In this way, some embodiments may employ the facial recognition module 118 to provide the photo tag suggestion module 116 with a set of persons, such as social network members, based on the facial recognition performed on individuals depicted in the photo. When performing facial recognition operations on the photo, the facial recognition module 118 may rely on various information provided by the social networking system 100 or other sources, such as facial recognition signatures and characteristics associated with one or more social network members. For some embodiments, facial recognition signatures and characteristics may assist the facial recognition module 118 with identifying a given face as a specific member of the social network of the user. In various embodiments, the facial recognition signatures and characteristics, and related associations with members, may be maintained in the social graph data 110. Other information relied upon by the facial recognition module 118 may include social signals, which may include any information relating to any aspect of relationships between social network members. Social signals may inform and refine the ability of the facial recognition module 118 to identify faces within the photo.

Various embodiments can involve other features and functionality. Although several of the embodiments are described in the context of photos, various embodiments can be practiced with respect to any type of image. Suggested tags in various embodiments may comprise keywords or terms associated with persons who may not be a connection of the user or who may not be in a social network of the user. Further, suggested tags in various embodiments may comprise keywords or terms other than those associated with the names of persons. Suggested tags can include keywords or terms relating to any aspect of the photo, for example, a location of a photo, objects depicted in the photo, time information of the photo, date information of the photo, the person who took the photo, classification or categorization of the photo, and other contextual information directly or indirectly associated with the photo.

Further, in some embodiments, the facial recognition module 118 can be replaced by or supplemented with an image recognition module that can recognize any objects in an image, and not merely faces of individuals. Such an image recognition module may be used to facilitate tagging of any objects, such as items, animals, scenes, buildings, places of interest, or any other depicted theme in an image. Such objects also may be tagged by a user in various embodiments of the invention.

Figure 2:
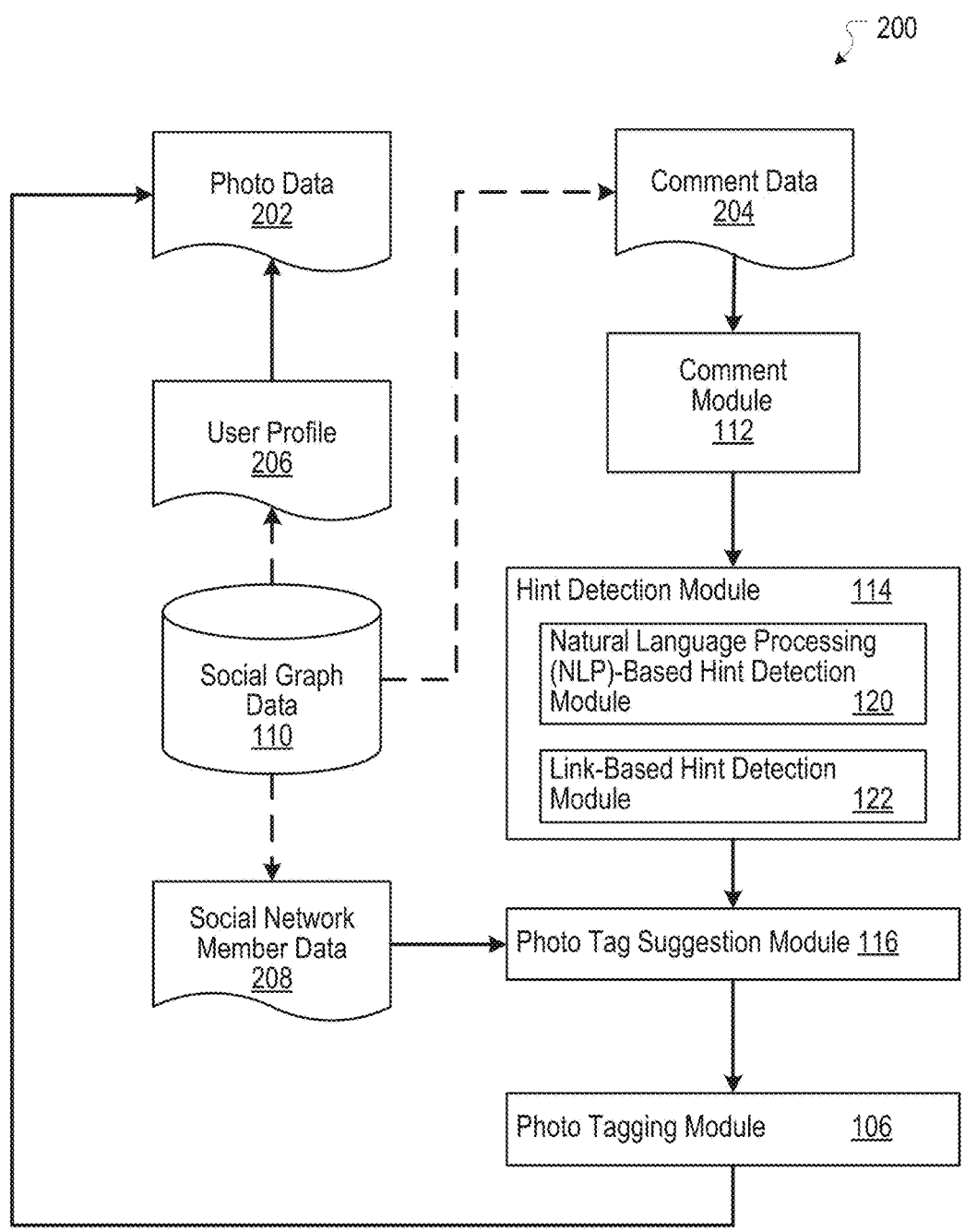
FIG. 2 illustrates an example data flow in an example system for using hints to tag images in a social networking system in accordance with an embodiment of the invention.

FIG. 2 illustrates an example data flow 200 in a system for using hints to tag images in a social networking system in accordance with an embodiment of the invention. In particular, the data flow 200 illustrates an example data flow between components of a social networking system, such as the social networking system 100 of FIG. 1. The data flow 200 as illustrated involves the photo tagging module 106, the social graph data 110, the comment module 112, the hint detection module 114, and the photo tag suggestion module 116. The data flow for various embodiments may differ from the data flow 200 in flow, sequence, or the components involved. In accordance with various embodiments described herein, the data flow 200 may commence upon detection of a photo tagging operation by a user (e.g., through use of the photo tagging module 106).

In the data flow 200, the comment module 112 may obtain comment data 204 associated with a given photo being tagged by a user of the social networking system 100. In some embodiments, some or all of the comment data 204 associated with the photo is retrieved from the social graph data 110, which supports functionality of the social networking system 100 in various embodiments.

The comment data 204 obtained by the comment module 112 may be provided to the hint detection module 114, which contains logic to identify one or more hints based on the comment data 204 that may assist the social networking system 100 in suggesting one or more tags during a photo tagging operation. As described herein, in some embodiments, the hint detection module 114 may comprise the NLP-based hint detection module 120, which is configured to identify hints in a comment based on natural language processing of comments. In some embodiments, the hint detection module 114 may additionally or alternatively comprise the link-based hint detection module 122, which is configured to identify hints based on one or more links detected in a comment.

The hints identified by the hint detection module 114 may be provided to the photo tag suggestion module 116, which contains logic to provide, based on the identified hints, a set of suggested tags to assist a user during photo tagging operations. In some embodiments, the set of suggested tags may initially be based on information obtained from the social networking system 100 relating to the photo being tagged or the user performing the photo tag operation. For instance, the photo tag suggestion module 116 may obtain social network member data 208 from the social networking system 100. The social network member data 208 may comprise a set of candidate social network members that are connected to or otherwise associated with the user performing the photo tag operation. For example, the selection of a candidate social network member may be based on the social network member's status as a top friend of the user or relevance to the photo tag operation being performed (e.g., social network member is the original poster of the photo). Other information can also be provided to the photo tag suggestion module 116 as a basis for determining candidate social network members for a photo tagging operation (e.g., user profile information, group associations, etc.). Depending on the embodiment, the social network member data 208 may be obtained from the social graph data 110.

From the information provided by the social networking system 100 (e.g., a set of candidate social network members) as a basis for candidate tags, the photo tag suggestion module 116 may identify suggested tags in view of the hints received from the hint detection module 114. In some embodiments, the identification of suggested tags may comprise matching or correlating hints received from the hint detection module 114 with the candidate tags. For instance, the social networking system 100 may provide the photo tag suggestion module 116 with a set of candidate social network members connected or associated with the user performing the photo tagging operation. The photo tag suggestion module 116 may generate from the set of candidate social network members a set of suggested tags relating to the identities of social network members that match or correspond to the hints received from the hint detection module 114. In some embodiments, determination of the set of candidate social network members and the set of suggested social network members, and their associated tags, may be at least in part based on coefficients.

The set of suggested tags generated by the photo tag suggestion module 116 may be provided to the photo tagging module 106, which contains logic to present the set of suggested tags to the user as the user is performing a photo tagging operation. As described herein, once the set of suggested tags is presented to the user for consideration, the user may select one or more presented tags to associate with the current photo the user is intending to tag. To illustrate the process of a tag being associated with the photo to be tagged, in FIG. 2 the photo tagging module 106 is shown as providing data to photo data 202 relating to the photo currently being tagged. For some embodiments, the photo data 202 may comprise the photo currently being tagged, and may further comprise metadata relating to the photo. As also shown, in some embodiments, the photo data 202 may be obtained from a user profile 206, which, in turn, may be obtained from the social graph data 110 supporting the social networking system 100. In some embodiments, the photo tagging module 106 may associate one or more tags with the photo by providing tag related data or adding tag related data to the photo data 202, as illustrated in FIG. 2. The tag related data provided or added to the photo data 202 may be maintained in the social graph data 110 for subsequent retrieval and usage.

Figure 3:
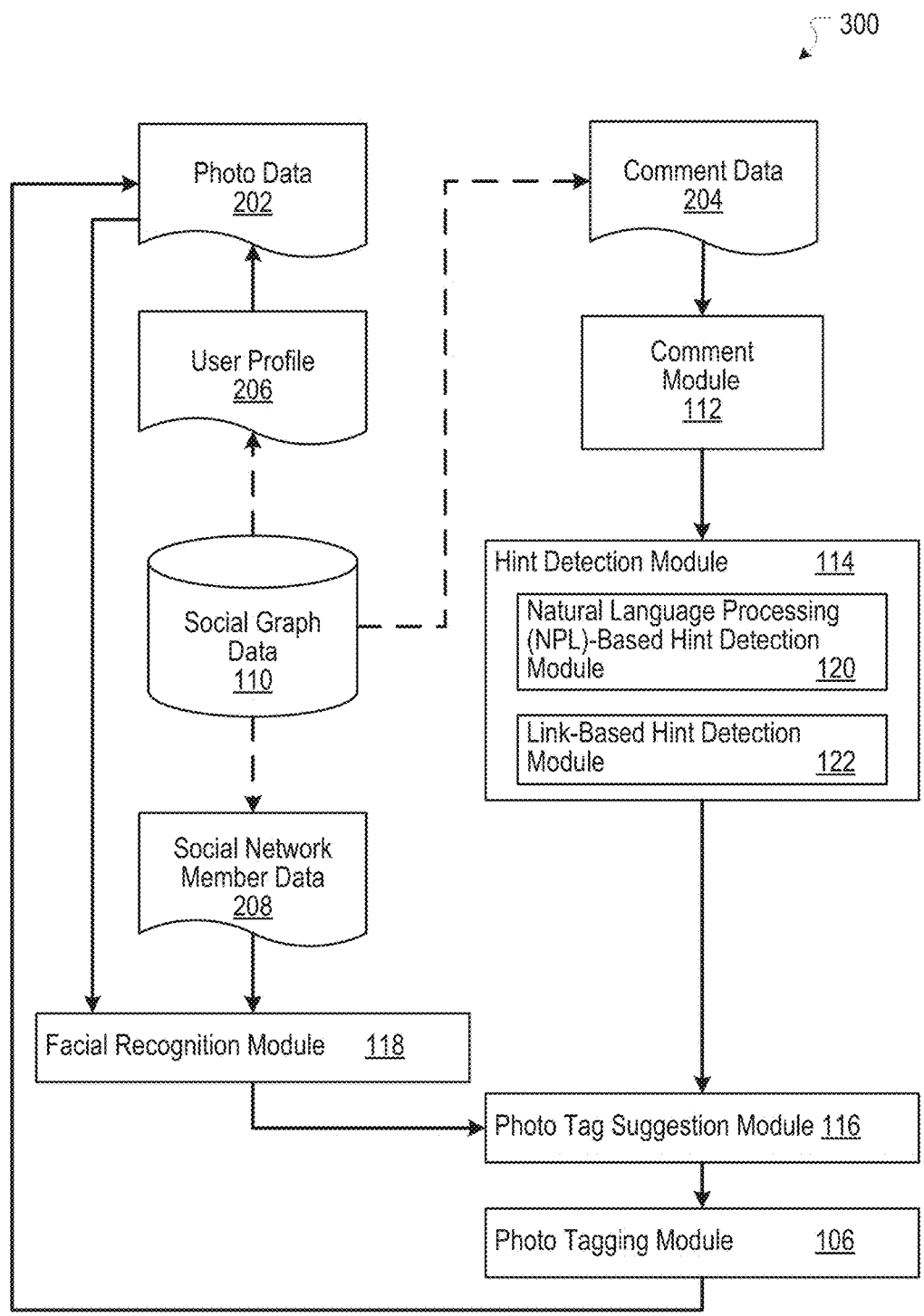
FIG. 3 illustrates an example data flow in an example system for using hints to tag images in a social networking system in accordance with an embodiment of the invention.

FIG. 3 illustrates an example data flow 300 in a system for using hints to tag images in a social networking system in accordance with an embodiment of the invention. In particular, the data flow 300 illustrates an example data flow between components of a social networking system, such as the social networking system 100 of FIG. 1. As illustrated in FIG. 3, the data flow 300 involves the photo tagging module 106, the social graph data 110, the comment module 112, the hint detection module 114, the photo tag suggestion module 116, and the facial recognition module 118. The data flow for various embodiments may differ from the data flow 300 in flow, sequence, or the components involved. In accordance with various embodiments described herein, the data flow 300 may commence upon detection of a photo tagging operation by a user (e.g., through use of the photo tagging module 106).

In the data flow 300, the comment module 112 may obtain comment data 204 associated with a given photo being tagged by a user of the social networking system 100. In some embodiments, some or all of the comment data 204 associated with the photo is retrieved from the social graph data 110, which supports functionality of the social networking system 100 in various embodiments.

The comment data 204 obtained by the comment module 112 may be provided to the hint detection module 114, which contains logic to identify one or more hints based on the comment data 204 that may assist the social networking system 100 in suggesting one or more tags during a photo tagging operation. As described herein, in some embodiments, the hint detection module 114 may comprise the NLP-based hint detection module 120, which is configured to identify hints in a comment based on natural language processing of comments. In some embodiments, the hint detection module 114 may additionally or alternatively comprise the link-based hint detection module 122, which is configured to identify hints based on one or more links detected in a comment.

The hints identified by the hint detection module 114 may be provided to the photo tag suggestion module 116, which contains logic to provide, based on the identified hints, a set of suggested tags to assist a user during photo tagging operations. As noted herein, the set of suggested tags may initially be based on information obtained from the social networking system 100 relating to the photo being tagged or the user performing the photo tag operation.

In the case of FIG. 3, the facial recognition module 118 may provide the photo tag suggestion module 116 with a set of candidate social network members generated from social network member data 208 based on identification of one or more individuals depicted in the photo. As discussed herein, the facial recognition module 118 may perform the recognition process on one or more portions of the photo being tagged by the user and attempt to identify faces in those portions. In some embodiments, the facial recognition module 118 may perform facial recognition on those portions of the photo that a user selects for associating with one or more tags (e.g., where the user is tagging a point or region in the photo).

To perform the facial recognition, the facial recognition module 118 may rely on various information provided by the social networking system 100, such as facial recognition signatures and characteristics associated with one or more social network members. As noted herein, facial recognition signatures and characteristics may assist the facial recognition module 118 with identifying a particular face as a social network member. In various embodiments, the facial recognition signatures and characteristics, and related associations, may be maintained as social network member data 208, which, in turn, may be maintained in and obtained from the social graph data 110. The facial recognition module 118 may also rely on other information from the social networking system 100, including a variety of social signals that pertain to social network members, thereby informing and refining the ability of the facial recognition module 118 to identify faces within the photo.

From the set of candidate social network members provided by the facial recognition module 118, the photo tag suggestion module 116 may identify suggested tags in view of the hints received from the hint detection module 114. In some embodiments, the identification of suggested tags may be based on matching or correlating hints received from the hint detection module 114 with the candidate tags associated with the set of candidate social network members. In some embodiments, the determination of the set of candidate social network members and the set of suggested social network members, and their associated tags, also may be at least in part based on coefficients.

The set of suggested tags generated by the photo tag suggestion module 116 may be provided to the photo tagging module 106, which contains logic to present the set of suggested tags to the user as the user is performing a photo tagging operation. As described herein, once the set of suggested tags is presented to the user for consideration, the user may select one or more presented tags to associate with the current photo the user is intending to tag. To illustrate the process of a tag being associated with the photo to be tagged, in FIG. 3 the photo tagging module 106 is shown as providing data to photo data 202 relating to the photo currently being tagged. As discussed herein, the photo data 202 may comprise the photo currently being tagged, and may further comprise metadata relating to the photo. As shown, in some embodiments, the photo data 202 may be obtained from a user profile 206, which, in turn, may be obtained from the social graph data 110 supporting the social networking system 100. In some embodiments, the photo tagging module 106 may associate one or more tags with the photo by providing tag related data or adding tag related data to the photo data 202, as illustrated in FIG. 3. The tag related data provided or added to the photo data 202 may be maintained in the social graph data 110 for subsequent retrieval and usage.

Figure 4:
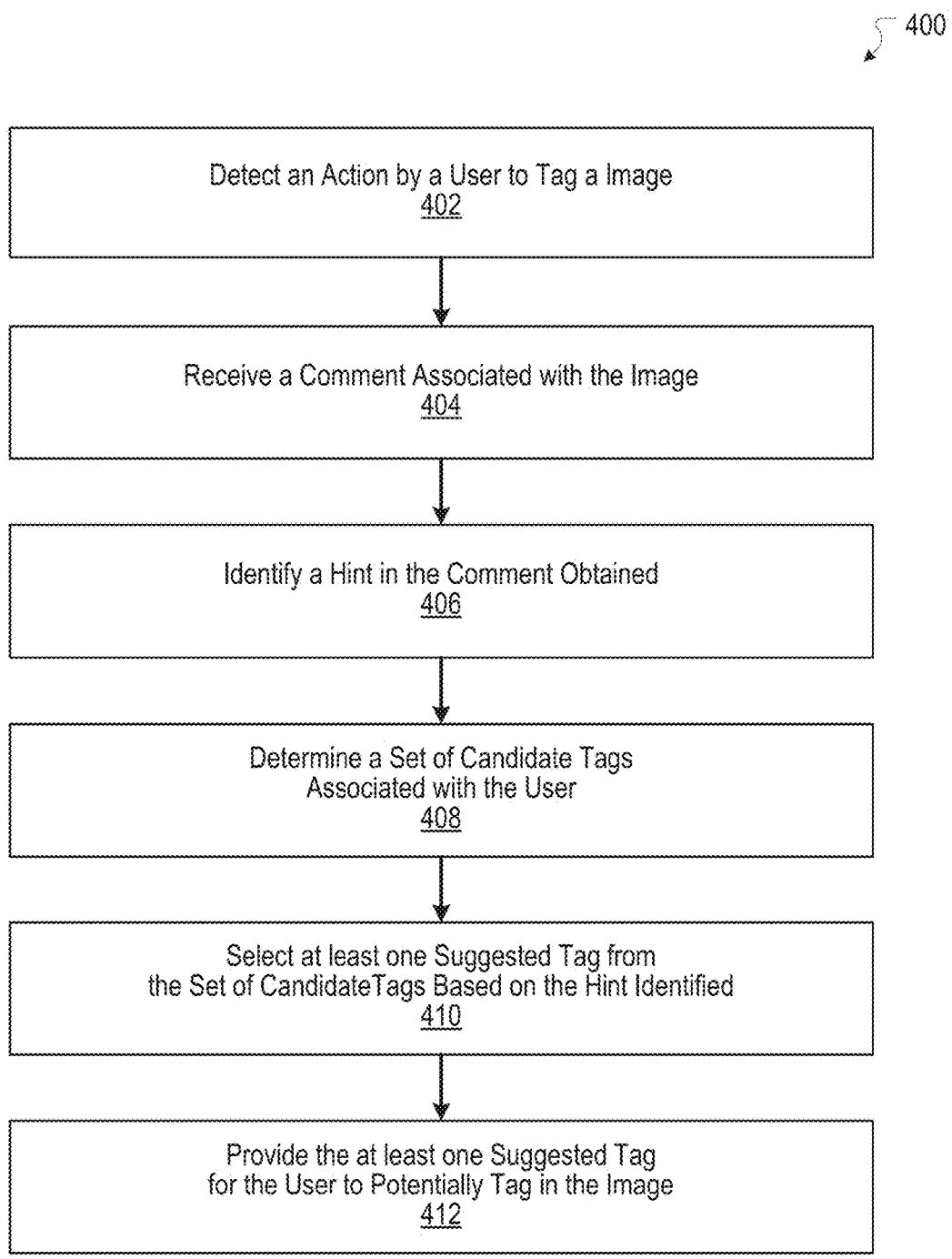
FIG. 4 illustrates an example process for using hints to tag images in a social networking system in accordance with an embodiment of the invention.

FIG. 4 illustrates an example process 400 for using hints to tag images in a social networking system in accordance with an embodiment of the invention. In an embodiment, the social networking system described in connection with FIG. 4 may be implemented as the social networking system 100. At block 402, an action by the user to tag an image (e.g., photo tagging operation) is detected. As discussed herein, the social networking system 100 may detect such an action when the user utilizes the photo tagging module 106 to tag the image. At block 404, a comment associated with the image is received. For example, a comment associated with the photo may be obtained. According to various embodiments, the comment may be obtained from the social graph data 110 by the comment module 112, which may maintain associations between comments and photos for the social networking system 100.

At block 406, a hint is identified based on the comment associated with the image. As discussed herein, the hint may be identified based on natural language processing, based on one or more links contained in the comment, based on the social network member posting the comment, or based on any combination of these or other factors. For some embodiments, the hint may be identified by the hint detection module 114, which may comprise the NLP-based hint detection module 120 to identify hints based on natural language processing and may comprise the link-based hint detection module 122 to identify hints based on links in the comment.

At block 408, a set of candidate tags associated with the user are determined. For example, the set of candidate tags may correspond to a set of candidate social network members associated with the user. For some embodiments, the set of candidate social network members may be obtained from the social graph data 110 by the photo tag suggestion module 116. At block 410, at least one suggested tag is selected from the set of candidate tags based on the hint identified. For instance, a set of suggested social network members may be generated from the set of candidate social network members based on the hint identified by block 406. A set of suggested tags associated with the set of suggested social network members may be selected.

At block 412, the at least one suggested tag is provided for the user to potentially tag the image. For example, the set of suggested tags may be provided to the user to assist the user in tagging the photo. As discussed herein, the set of suggested tags may be provided to the user through the photo tagging module 106, which may be employed by the user during the photo tagging operation.

Figure 5:
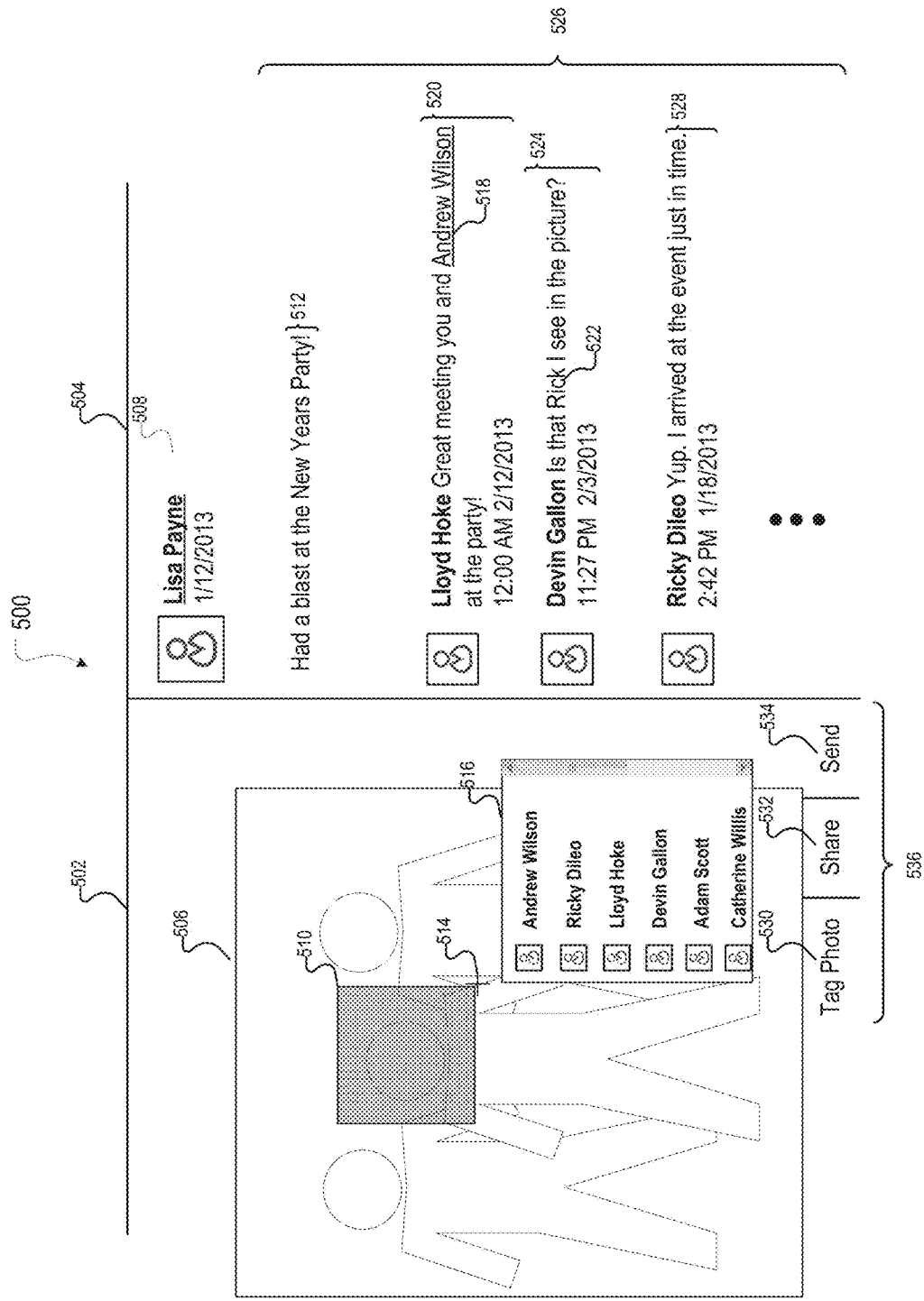
FIG. 5 illustrates an example graphical user interface for using hints to tag images in a social networking system in accordance with an embodiment of the invention.

FIG. 5 illustrates an example graphical user interface 500 for using hints to tag images in a social networking system, such as the social networking system 100, in accordance with an embodiment of the invention. In particular, the interface 500 may be one presented to the user device 104 by the social networking system 100 when a user of the user device 104 is viewing a photo 506 posted to the social networking system 100 by a social network member 508, "Lisa Payne." In an embodiment, the interface 500 may be presented to the user device 104 by the social networking system 100 as markup language that, when processed by the user device 104, displays the interface 500 on the user device 104.

As illustrated, the interface 500 includes a photo pane 502 in which the photo 506 is presented, and a comments pane 504 in which one or more comments associated with the photo 506 are presented. Comments displayed in the comments pane 504 may include those posted to a comment dialog 526, associated with the photo 506, by the user who posted the photo 506 to the social networking system 100 (e.g., comment 512 posted by the social network member 508) and by various other social network members. As shown in FIG. 5, the comment dialog 526 includes the comment 512 posted by user "Lisa Payne," a comment 520 posted by user "Lloyd Hoke," a comment 524 posted by user "Devin Gallon," and a comment 528 posted by user "Ricky Dileo."

For illustrative purposes, the comment 520 posted by user "Lloyd Hoke" contains a link 518 to social network member "Andrew Wilson," while the comment 524 posted by user "Devin Gallon" mentions the name 522 of an individual (i.e., "Rick") without a link. As described herein, the social networking system 100 may detect one or more hints based on the comments posted in association with the photo 506. The social networking system 100 may, for example, detect the link 518 or the name 522 as hints that can be utilized by the social networking system 100 to generate a set of suggested tags for the user during a photo tagging operation. As noted herein, the identities of social network members posting comments to the comment dialog 526 can also be utilized as hints for suggesting tags. The hints may be relied upon to generate a set of social network members as suggested tags, from which a user can select for tagging the photo 506.

In FIG. 5, the photo pane 502 includes a photo operations menu 536 from which a user may select various photo operations, such as a photo tagging operation 530, a photo share operation 532 to share the photo 506 on the user's social networking profile, and a photo send operation 534 to send the photo 506 to a social network member. When the photo tagging operation 530 is selected by the user, the user may be presented with a mouse cursor 514 that permits the user to select a point or a region 510 in the content of the photo 506 to associate with one or more tags. In a given instance, the user may select the region 510 such that it is disposed over one or more faces of one or more individuals. According to some embodiments, once a user selects a point or region in the photo 506, the interface 500 presents a list 516 of social network members as suggested tags from which the user can select one or more social network members as tags to be associated with the selected point or region.

In some embodiments, the list 516 may include both candidate tags associated with candidate social network members as well as suggested tags associated with suggested social network members. When both types of tags are presented for the user, the suggested tags may appear more prominently or may be otherwise emphasized for selection by the user. For example, the suggested tags may appear at the top of a larger listing of candidate tags.

Further, in some embodiments, the suggested tags may be associated with objects other than social network members. For example, the suggested tags may be associated with any objects, such as items, animals, scenes, buildings, places of interest, or any other depicted theme in an image. The objects may be recognized by the social networking system 100, as reflected, for example, in the social graph data 110.

Figure 6:
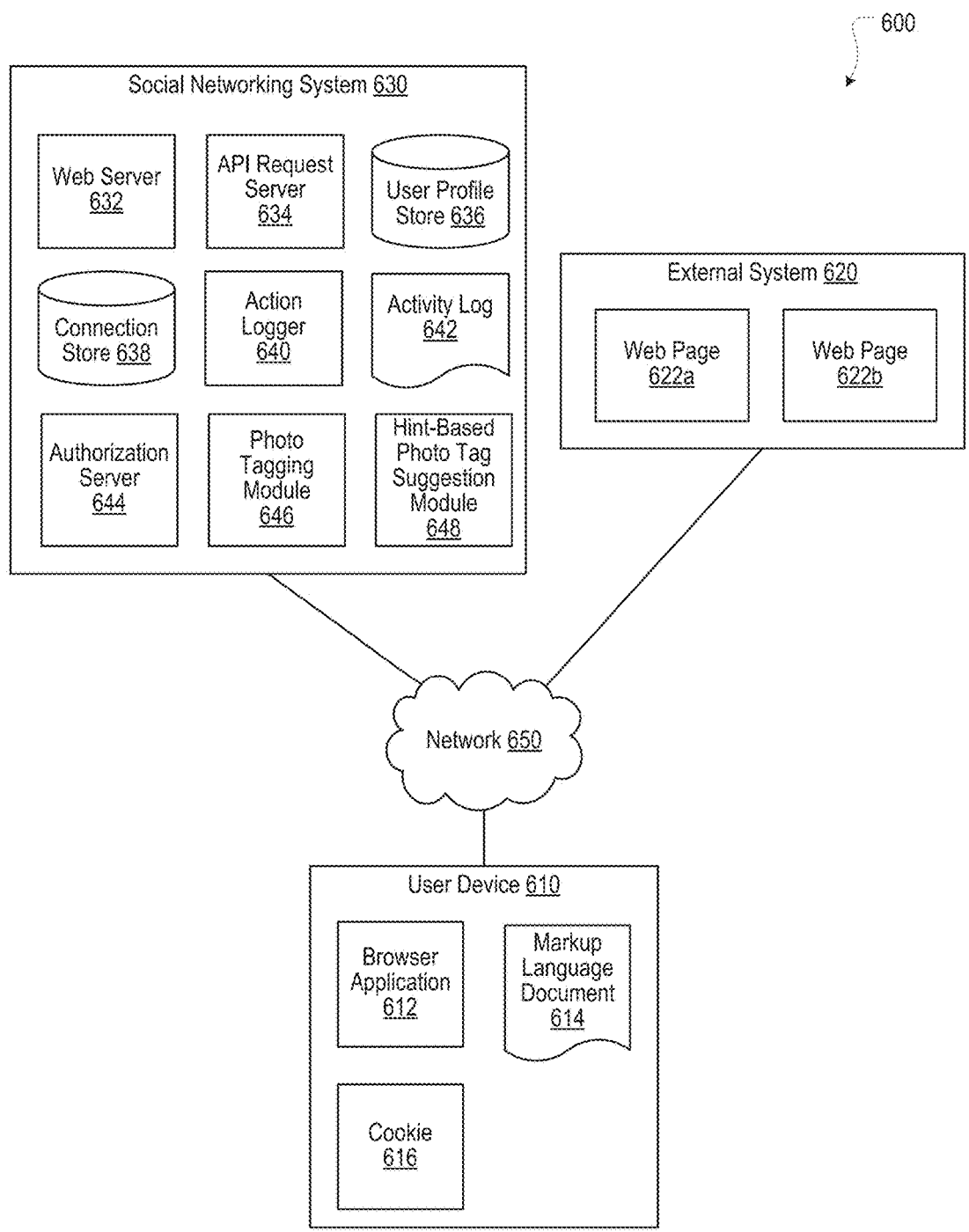
FIG. 6 is a network diagram of an example system for using hints to tag images in a social networking system in accordance with an embodiment of the invention.

FIG. 6 is a network diagram of a system 600 for using hints to tag images in a social networking system 630 in accordance with an embodiment of the invention. In an embodiment, the social networking system 100, the photo tagging module 106, and the hint-based photo tag suggestion module 108 may be implemented in or as the social networking system 630. The system 600 includes one or more user devices 610, one or more external systems 620, the social networking system 630, and a network 650. For purposes of illustration, the embodiment of the system 600, shown by FIG. 6, includes a single external system 620 and a single user device 610. However, in other embodiments, the system 600 may include more user devices 610 and more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and wide area networks, using wired and/or wireless communication systems.

In one embodiment, the network 650 uses standard communications technologies and protocols. Thus, the network 650 can include links using technologies such as Ethernet, 602.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable customization of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. As described herein, the social network can be represented by a graph, i.e., a data structure including edges and nodes. Other data structures can also be used to represent the social network, including but not limited to databases, objects, classes, meta elements, files, or any other data structure.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. As discussed herein, the social networking system 630 can generate and maintain a "social graph" comprising a plurality of nodes interconnected by a plurality of edges, where each node in the social graph may represent an entity that can act on another node and/or that can be acted on by another node. The social graph may include various types of nodes, including, for example, users, non-person entities, content items, web pages, groups, activities, messages, concepts, and any other things that can be represented by an object in the social networking system 630. As noted herein, an edge between two nodes in the social graph may represent a particular kind of connection, or association, between the two nodes, which may result from node relationships or from an action that was performed by one of the nodes on the other node. As further discussed, the edges between nodes can be weighted, where the weight of an edge can represent an attribute associated with the edge, such as a strength of the connection or association between nodes. Different types of edges can be provided with different weights.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third-party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, an authorization server 644, a photo tagging module 646, and a hint-based photo tag suggestion module 648. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

As described above in further detail, the photo tagging module 646 contains logic that enables or otherwise assists a user of the social networking system 630 to associate one or more tags with one or more images, such as photos, supported by the social networking system 630. As described herein, a tag can comprise one or more terms or keywords that can be associated with an image, and the act of tagging an image can comprise the act of associating one or more tags with that image. Once a tag is associated with an image, the tag can be used to describe the image and can further be used to organize, sort, or locate the image when the image is part of a collection of images. As described herein, tags that can be used include, for example, names of individuals (e.g., those individuals depicted in the photo or present at the location of photo), subjects or topics relating to the subject matter depicted in the photo, the location of the photo, the time or date of the photo, classification or categorization of the photo, contextual information about the photo, or any other references related to any aspect related to the photo. For some embodiments, the photo tagging module 646 may facilitate tagging of a photo by presenting a graphical user interface, such as the one illustrated in FIG. 5, through which a user of the social networking system 630 may invoke or otherwise execute photo tagging operations. For example, the graphical user interface presented by the photo tagging module 646 may permit a user to select a region in the photo which the user intends to associate with one or more tags.

As described above in further detail, the hint-based photo tag suggestion module 648 contains logic to identify one or more hints based on a comment associated with a photo and assist in providing one or more tag suggestions when a user is tagging the photo. For some embodiments, the hint-based photo tag suggestion module 648 identifies hints and provides suggested tags by obtaining a comment associated with a photo the user intends to tag, and then identifying a hint based on the comment that may be useful in suggesting at least one member of the social network. The hint-based photo tag suggestion module 648 may obtain a set of candidate members of the social network that are associated with the user. The hint-based photo tag suggestion module 648 may generate a set of suggested members from the set of candidate members based on the hint, and provide to the user a set of suggested tags associated with the set of suggested members to assist the user in tagging the photo. In some embodiments, the hint-based photo tag suggestion module 648 performs some or all of the foregoing operations in response to the social networking system 630 detecting initiation of a photo tagging action by a user. Such detection may occur when, for instance, a user employs the photo tagging module 106 to tag a photo provided by the social networking system 630.

Figure 7:
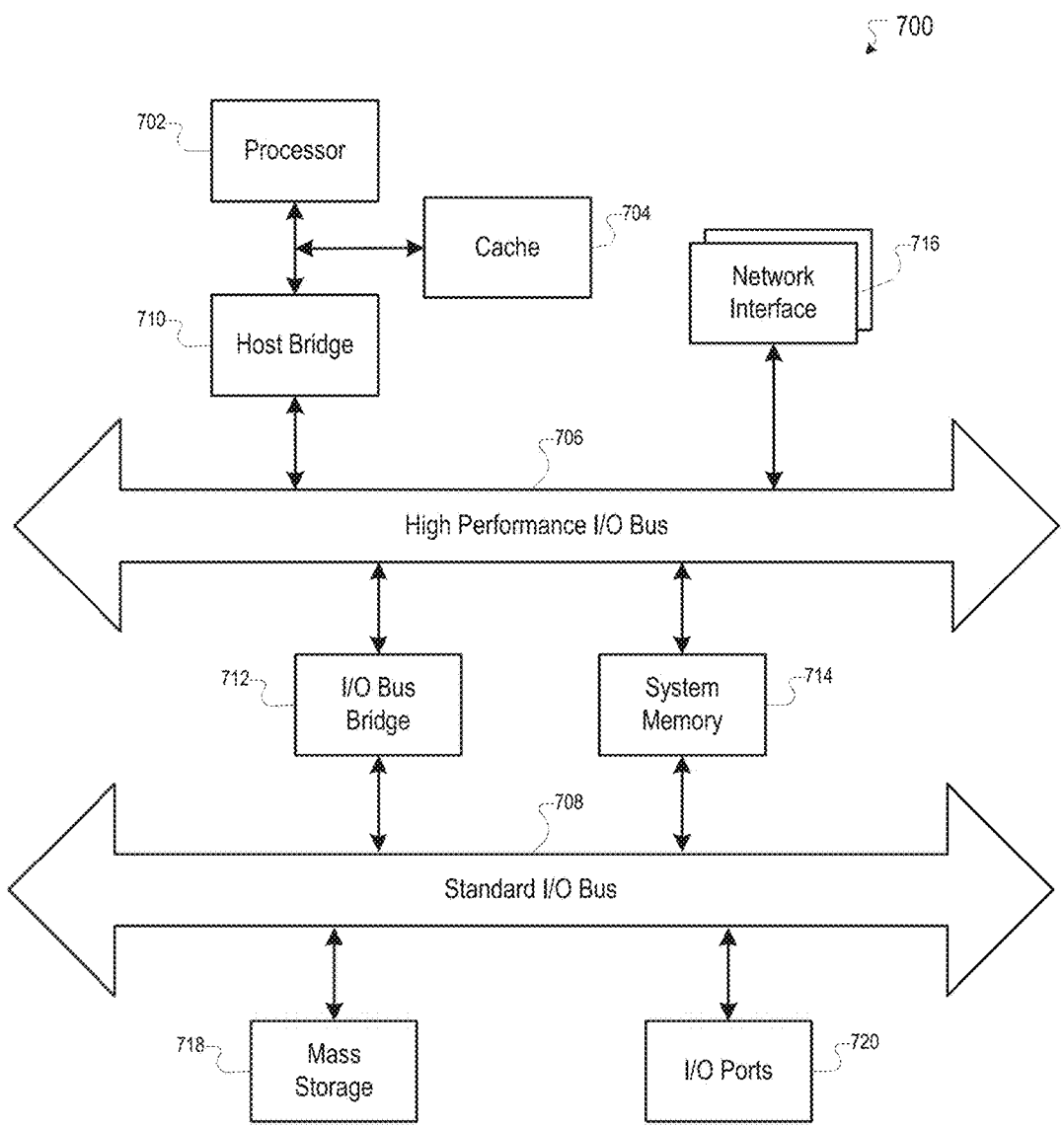
FIG. 7 shows a diagram of a computer system in accordance with an embodiment of the invention.

The foregoing processes and features can be implemented by a wide variety of machine and computer system architectures and in a wide variety of network and computing environments. FIG. 7 illustrates an example of a computer system 700 that may be used to implement one or more of the computing devices identified above. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, the external system 620, or a component thereof. In an embodiment of the invention, the computer system 700 may be one server among many that constitutes all or part of the social networking system 630.

The computer system 700 includes a processor 702, a cache memory 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples the processor 702 to the high performance I/O bus 706, whereas I/O bus bridge 712 couples the two buses 706 and 708 to each other. A system memory 714 and one or more network interfaces 716 couple to the bus 706. The computer system 700 may further include video memory and a display device coupled to the video memory (not shown). Mass storage 718 and I/O ports 720 couple to the bus 708. The computer system 700 may optionally include a keyboard and pointing device, a display device, or other input/output devices (not shown) coupled to the bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System; the Apple Macintosh Operating System, available from Apple Computer Inc. of Cupertino, Calif.; UNIX operating systems; Microsoft® Windows® operating systems; BSD operating systems; and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Furthermore, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 which, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714, and then accessed and executed by processor 702. In various implementations, a module or modules can be executed by a processor or multiple processors in one or multiple locations, such as multiple servers in a parallel processing environment.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "other embodiments", "another embodiment", "various embodiments", "certain embodiments", or the like means that a particular feature, design, structure, or characteristic described in connection with the embodiment is included in at least one embodiment of the disclosure. The appearances of, for example, the phrase "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
  receiving, by a computing system, information associated with a content item comprising an image to be tagged by a user of a social networking system;
  detecting, by the computing system, a hint suggestive of at least one aspect relating to the content item, based on the information;
  performing, by a computing system, image recognition on at least one object depicted in the image to obtain identified objects, wherein the image recognition comprises facial recognition;
  selecting, by the computing system, at least one suggested tag based on the hint and the identified objects; and
  providing, by the computing system, the at least one suggested tag for the user to potentially tag the content item.

2. The method of claim 1, wherein the at least one aspect includes at least one of identity of an individual associated with the content item, identity of an object associated with the content item, location associated with the content item, identity of a person who created the content item, classification of the content item, or contextual information about the content item.

3. The method of claim 1, further comprising:
  determining a set of candidate tags associated with a set of objects in a social network of the user, wherein the at least one suggested tag is from the set of candidate tags.

4. The method of claim 1, wherein the hint is based on a reference embedded in the information as the information is created.

5. The method of claim 4, wherein the reference is a link to a profile page of an object in a social network of the user.

6. The method of claim 1, wherein the hint comprises a name identified based at least in part on natural language processing.

7. The method of claim 1, wherein the at least one suggested tag is provided for the user in a list of tags sorted according to relevancy.

8. The method of claim 1, wherein the information is created by at least one of the user or an object in a social network of the user.

9. The method of claim 1, further comprising:
  detecting an action by the user to tag the content item, wherein the action comprises selection by the user of at least one of a position or a region in the content item.

10. The method of claim 1, wherein the facial recognition uses facial signatures and characteristics associated with one or more social network members to identify a given face as a specific member of the social network.

11. A system comprising:
  at least one processor; and
  a memory storing instructions that, when executed by the at least one processor, cause the system to perform:
    receiving information associated with a content item comprising an image to be tagged by a user of a social networking system;
    detecting a hint suggestive of at least one aspect relating to the content item, based on the information;
    performing image recognition on at least one object depicted in the image to obtain identified objects, wherein the image recognition comprises facial recognition;
    selecting at least one suggested tag based on the hint and the identified objects; and
    providing the at least one suggested tag for the user to potentially tag the content item.

12. The system of claim 11, wherein the at least one aspect includes at least one of identity of an individual associated with the content item, identity of an object associated with the content item, location associated with the content item, identity of a person who created the content item, classification of the content item, or contextual information about the content item.

13. The system of claim 11, further comprising:
  determining a set of candidate tags associated with a set of objects in a social network of the user, wherein the at least one suggested tag is from the set of candidate tags.

14. The system of claim 11, wherein the hint is based on a reference embedded in the information as the information is created.

15. The system of claim 14, wherein the reference is a link to a profile page of an object in a social network of the user.

16. A non-transitory computer-readable storage medium including instructions that, when executed by at least one processor of a computing system, cause the computing system to perform a method comprising:
   receiving information associated with a content item comprising an image to be tagged by a user of a social networking system;
   detecting a hint suggestive of at least one aspect relating to the content item, based on the information;
   performing image recognition on at least one object depicted in the image to obtain identified objects, wherein the image recognition comprises facial recognition;
   selecting at least one suggested tag based on the hint and the identified objects; and
   providing the at least one suggested tag for the user to potentially tag the content item.

17. The non-transitory computer-readable storage medium of claim 16, wherein the at least one aspect includes at least one of identity of an individual associated with the content item, identity of an object associated with the content item, location associated with the content item, identity of a person who created the content item, classification of the content item, or contextual information about the content item.

18. The non-transitory computer-readable storage medium of claim 16, further comprising:
   determining a set of candidate tags associated with a set of objects in a social network of the user, wherein the at least one suggested tag is from the set of candidate tags.

19. The non-transitory computer-readable storage medium of claim 16, wherein the hint is based on a reference embedded in the information as the information is created.

20. The non-transitory computer-readable storage medium of claim 19, wherein the reference is a link to a profile page of an object in a social network of the user.

* * * * *